(12) United States Patent
Childers

(10) Patent No.: US 6,832,015 B2
(45) Date of Patent: Dec. 14, 2004

(54) SWITCHING APPARATUS

(75) Inventor: Winthrop D. Childers, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 200 days.

(21) Appl. No.: 10/187,348

(22) Filed: Jun. 28, 2002

(65) Prior Publication Data

US 2004/0001667 A1 Jan. 1, 2004

(51) Int. Cl.[7] ............................................... G02B 6/26
(52) U.S. Cl. ............................................ 385/18; 337/298
(58) Field of Search .................... 385/16–18; 337/300, 337/298; 200/43.18

(56) References Cited

U.S. PATENT DOCUMENTS

| | | | |
|---|---|---|---|
| 4,480,259 A | | 10/1984 | Kruger et al. |
| 4,720,171 A | * | 1/1988 | Baker .......................... 349/197 |
| 4,737,019 A | * | 4/1988 | Baker .......................... 349/196 |
| 4,820,887 A | * | 4/1989 | Schmitz .................... 200/43.18 |
| 5,604,519 A | | 2/1997 | Keefe et al. |
| 5,699,462 A | * | 12/1997 | Fouquet et al. ................ 385/18 |
| 5,732,168 A | | 3/1998 | Donald |
| 5,852,689 A | * | 12/1998 | Donald ........................ 385/21 |
| 5,897,805 A | * | 4/1999 | McClean .................... 219/518 |
| 5,953,469 A | | 9/1999 | Zhou |
| 5,960,131 A | | 9/1999 | Fouquet et al. |
| 6,154,586 A | * | 11/2000 | MacDonald et al. .......... 385/18 |
| 6,188,815 B1 | * | 2/2001 | Schiaffino et al. ............ 385/16 |
| 6,198,566 B1 | | 3/2001 | Takeda et al. |
| 6,342,826 B1 | * | 1/2002 | Quinn et al. ................. 337/300 |
| 6,345,883 B1 | | 2/2002 | Shin et al. |
| 6,360,775 B1 | * | 3/2002 | Barth et al. ................. 137/828 |
| 6,519,381 B2 | * | 2/2003 | Hatta et al. ................... 385/16 |

FOREIGN PATENT DOCUMENTS

| | | |
|---|---|---|
| JP | 2248913 | 10/1990 |
| JP | 2000105345 | 4/2000 |

OTHER PUBLICATIONS

Wavequide Panel Display Using Electromechanical Spatial Modulators, X. Zhou and E. Gulari, 1998 SID International Symposium Digest of Technical Papers, vol. 29, p. 1022–5.

* cited by examiner

*Primary Examiner*—Ellen E. Kim

(57) ABSTRACT

Switching apparatus that includes a bubble generator, a flexible membrane disposed over the bubble generator and selectively expanded by the bubble generator, and a switch circuit controlled by expansion of the flexible membrane.

7 Claims, 7 Drawing Sheets

SWITCHING APPARATUS

BACKGROUND OF THE DISCLOSURE

Optical fibers are replacing conductive wires in telephone and data communications, since optical fibers provide extremely high bandwidth, are immune to radio frequency noise, and generate virtually no electromagnetic interference. As the cost of optical fibers decreases, use of optical fibers is expanding to applications that require switching to dynamically reconfigure the interconnection of optical signal paths. However, it is often difficult to achieve switching of optical signals.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION OF THE DISCLOSURE

Figure 1A:
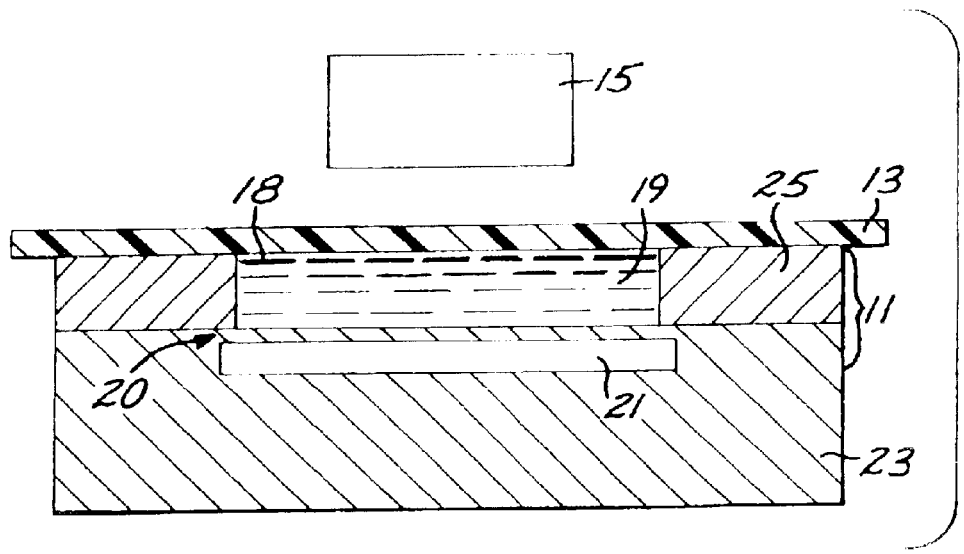
FIGS. 1A and 1B schematically depict an embodiment of a switching apparatus that includes a bubble generator.
Figure 1B:
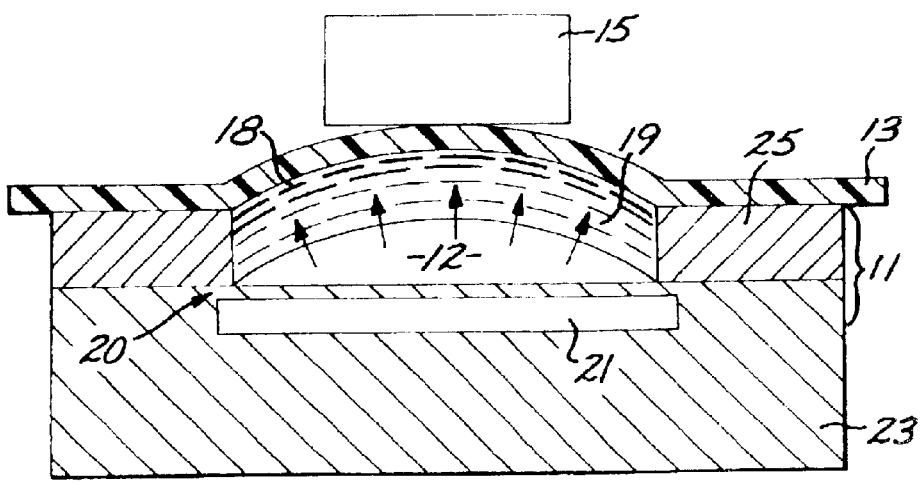

FIGS. 1A and 1B schematically illustrate an embodiment of a switching apparatus that includes a bubble driven actuator 20 formed for example of a bubble generator 11 and a flexible membrane 13 disposed over the bubble generator 11. A switch circuit 15 is positioned adjacent the flexible membrane 13, and the bubble generator 11 is controlled to selectively produce a bubble 12 that causes the flexible membrane 13 to expand and contactively engage the switch circuit 15, as more particularly illustrated in FIG. 1B. The engagement of the flexible membrane 13 with the switch circuit 15 controls or actuates the switch circuit. The bubble generator 11 can be embodied for example as a thermal bubble generator similar to thermal bubble generators employed in thermal ink jet printers, and can include a fluid chamber 19, a working fluid 18 in the fluid chamber, and a heater resistor 21 adjacent the fluid chamber. By way of illustrative examples, the fluid chamber 19 can comprise an opening in a fluid barrier layer 25, and the heater resistor 21 is formed in an integrated circuit structure 23. An example of a thermal bubble generator employed in thermal ink jet printing can be found in commonly assigned U.S. Pat. No. 5,604,519.

The switch circuit 15 of the embodiment shown in FIGS. 1A and 1B can comprise, for example, electrical, mechanical and/or electro-optical switching elements that are selectively engaged by expansion of the flexible membrane.

Figure 2A:
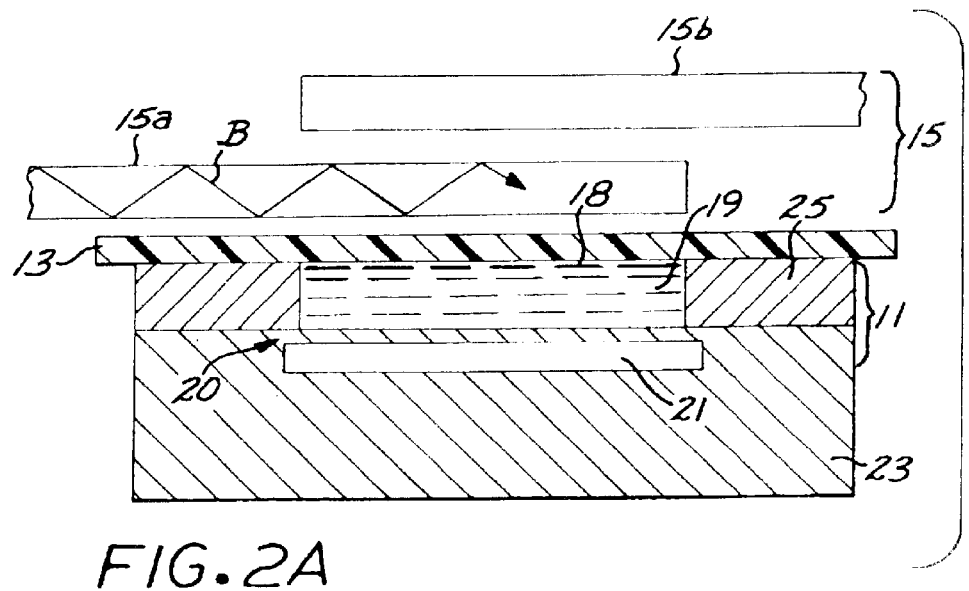
FIGS. 2A and 2B schematically depict an embodiment of a switch circuit that can be employed in the embodiment of a switching apparatus depicted in FIGS. 1A and 1B.
Figure 2B:
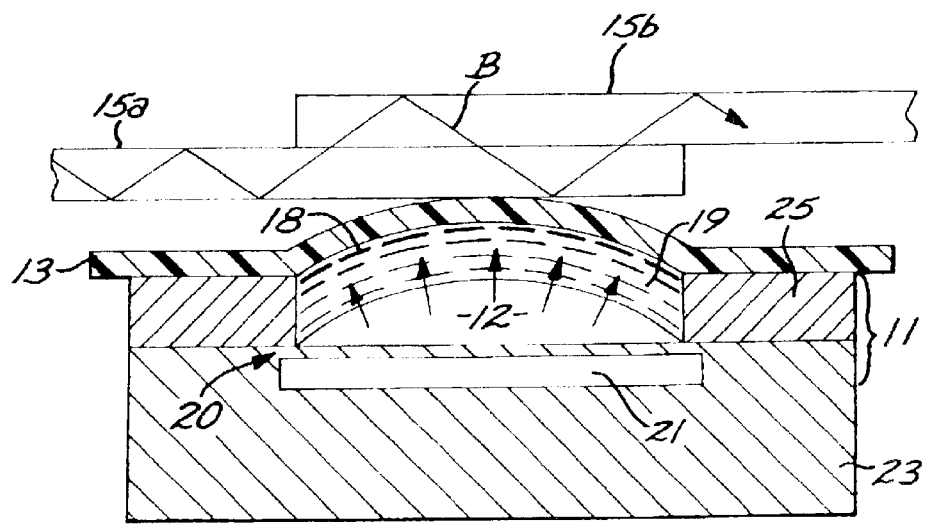

FIGS. 2A and 2B schematically depict an embodiment of a switch circuit 15 that includes a first waveguide 15a and a second waveguide 15b that are configured to provide an optical path for light energy when they are engaged such that a beam B in one of the waveguides is transmitted to the other waveguide when the waveguides are engaged. The first waveguide 15a and the second waveguide 15b can for example be fiber optic waveguides or prisms.

Figure 3A:
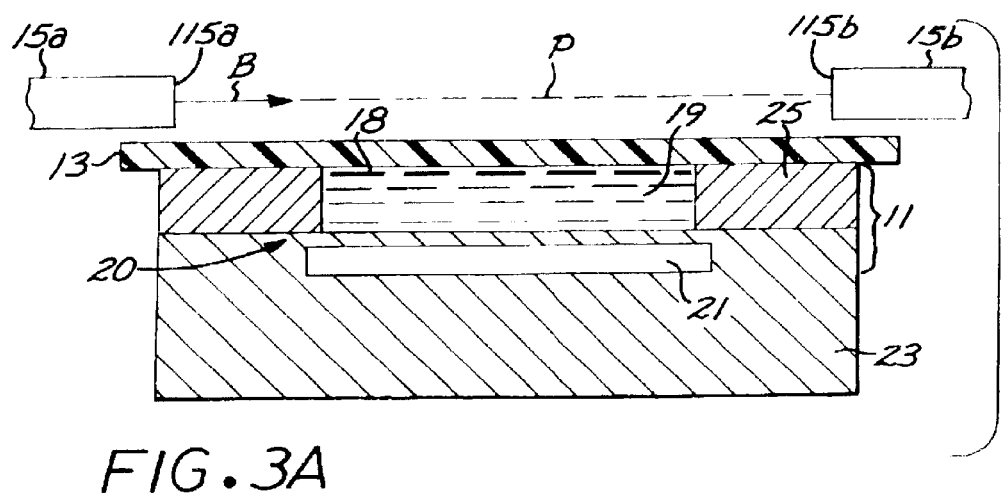
FIGS. 3A and 3B schematically depict an embodiment of a further switching apparatus that includes a bubble generator.
Figure 3B:
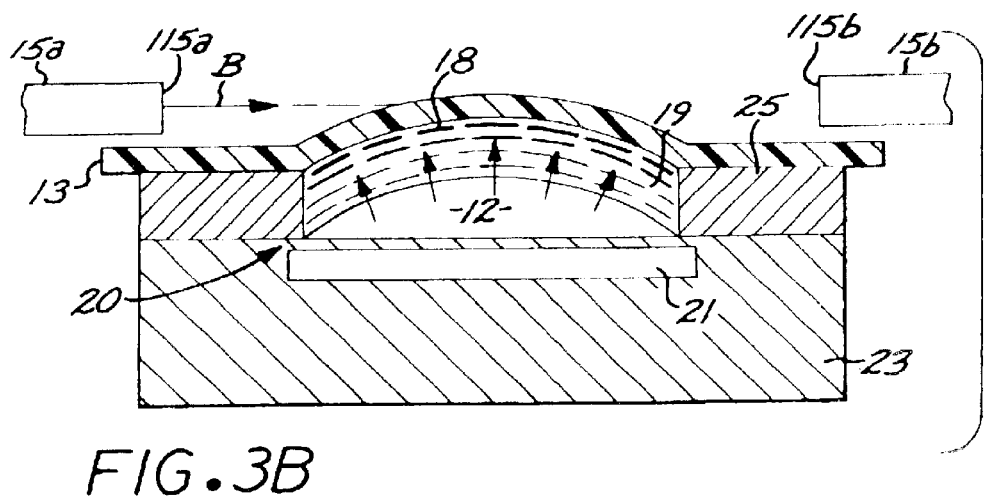

FIGS. 3A and 3B schematically depict an embodiment of a switching apparatus that includes a bubble driven actuator 20 formed of a bubble generator 11 and a flexible membrane 13 disposed over the bubble generator 11. The switching apparatus further includes an optical switch comprised of a first optical waveguide 15a and a second optical waveguide 15b that have respective input/output (I/O) ends 115a, 115b located on opposite sides of the bubble generator 11 and optically aligned to provide a light path P between such I/O ends when the membrane 13 is not expanded, such that a light beam B emitting from the I/O end of one of the waveguides enters the I/O end of the other waveguide when the membrane 13 is not expanded. The opposing I/O ends 115a, 115b are further positioned sufficiently closely to the plane of the flexible membrane 13 such that expansion of the membrane 13 will interrupt the light path between the I/O ends and block optical transmission between of the light beam B, as shown in FIG. 5B. In this manner, switching is accomplished by selectively generating a bubble to deflect the flexible membrane 13. By way of illustrative example, one or more of the optical waveguides can be a fiber optic waveguide.

Figure 4A:
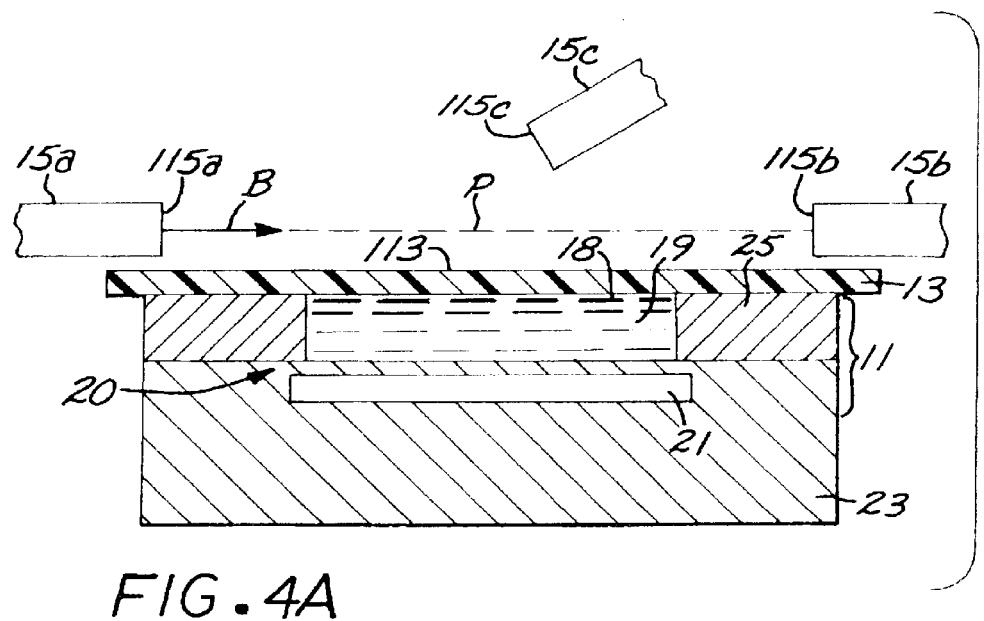
FIGS. 4A and 4B schematically depict an embodiment of another switching apparatus that includes a bubble generator.
Figure 4B:
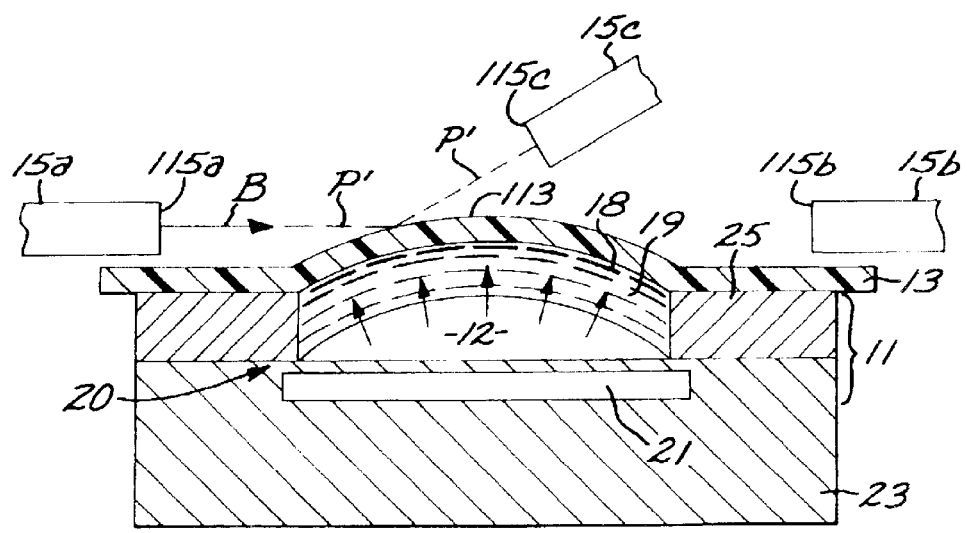

FIGS. 4A and 4B schematically depict an embodiment of a switching apparatus that includes a bubble driven actuator 20 formed of a bubble generator 11 and a flexible membrane 13 disposed over the bubble generator 11, a reflective surface 113 on the flexible membrane 13, and an optical switch circuit that includes a first optical waveguide 15a, a second optical waveguide 15b, and a third optical waveguide 15c. The first optical waveguide 15a and the second optical waveguide 15b have respective input/output (I/O) ends 115a, 115b that face each other on opposite sides of the bubble generator 11 and are optically aligned to provide an optical path P between such I/O ends when the membrane 13 is not expanded, such that a light beam B emitting from the I/O end 115a of the first optical waveguide 15a enters the I/O end 115b of the second optical waveguide 15b when the membrane 13 is not expanded, so that a light beam B emitting from the I/O end 115a of the first optical waveguide 15a, for example, illuminates the I/O end 115b of the second optical waveguide 15b when the membrane 13 is not expanded. The opposing I/O ends 115a, 115b and an I/O end 115c of the third optical waveguide 15 are further positioned such that expansion of the membrane 13 interrupts the optical path P between the I/O ends 115a, 115b, and creates an optical path P' between the I/O end 115a of the first optical waveguide 15a and the I/O end 115c of the third optical waveguide 15c. The optical path P' more particularly includes a segment between the I/O end 115a and the reflective surface 113, and another segment between the reflective surface 113 and the I/O end 115c of the third optical waveguide 15b. Thus, when the membrane 13 is expanded a light beam B exiting the I/O end 115a, for example, is reflected toward the I/O end 115c, as depicted in FIG. 4B. Switching is accomplished by selectively energizing the bubble generator 11 to generate a bubble that expands the flexible reflective membrane 13. By way of illustrative example, one or more of the optical waveguides can be a fiber optic waveguide.

Figure 5A:
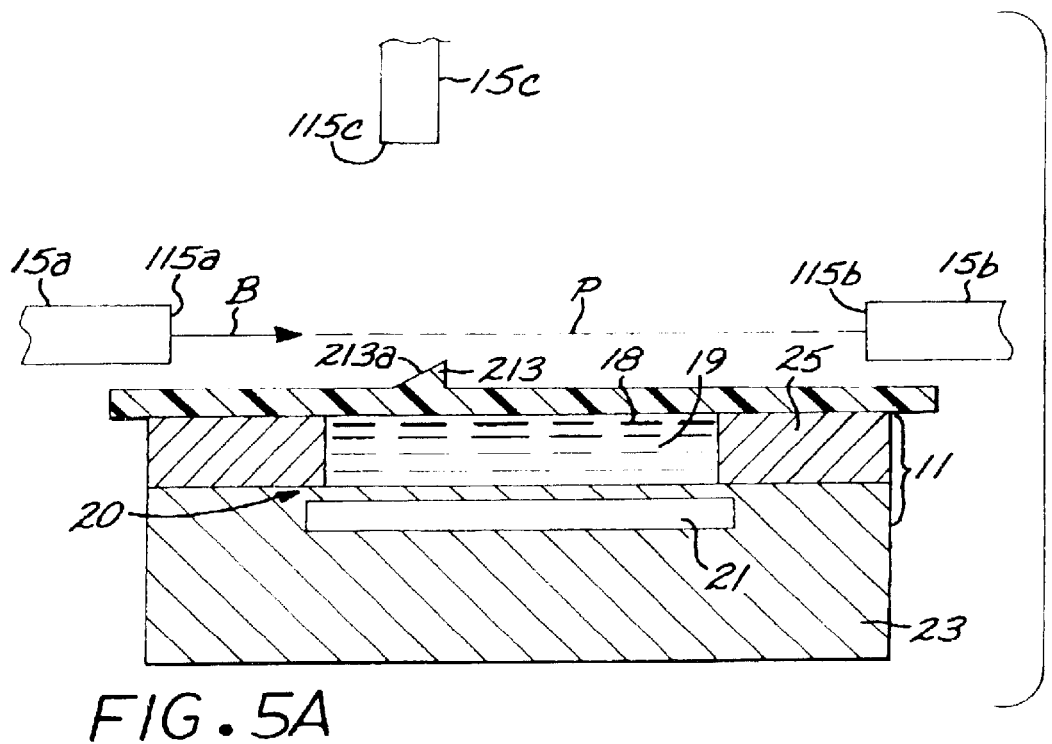
FIGS. 5A, 5B and 5C schematically depict an embodiment of yet another switching apparatus that includes a bubble generator.
Figure 5B:
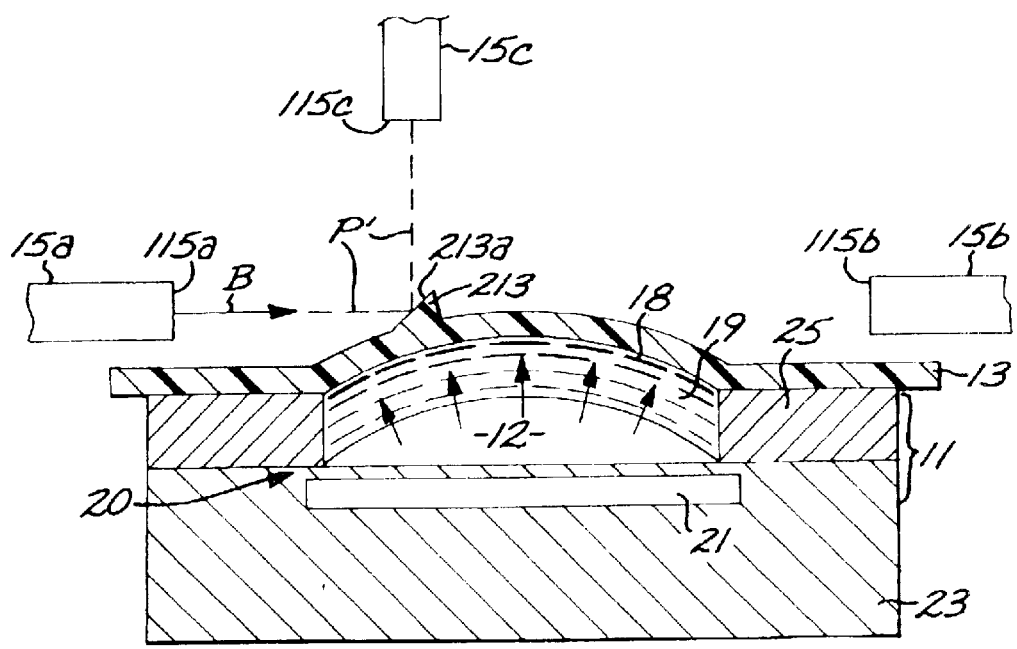
Figure 5C:
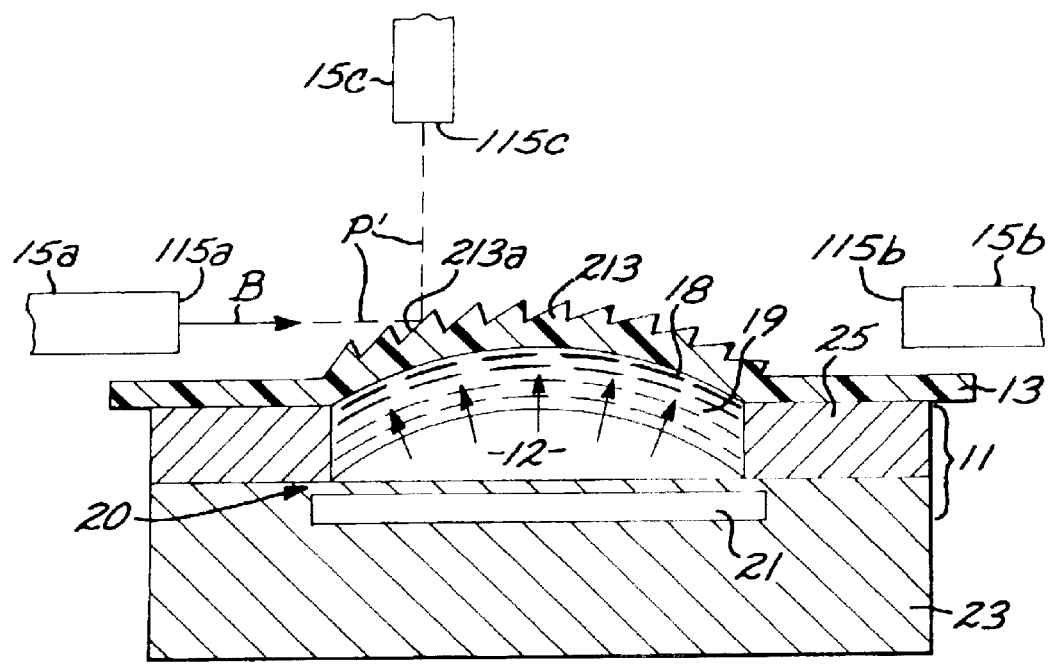

FIGS. 5A–5C schematically depict an embodiment of a switching apparatus that includes a bubble driven actuator 20 formed of a bubble generator 11 and a flexible membrane 13 disposed over the bubble generator 11, a reflective optical element 213 disposed on the flexible membrane 13, and an optical switch comprised of a first optical waveguide 15a, a second optical waveguide 15b, and a third optical waveguide 15c. The first and second optical waveguides includes respective input/output (I/O) ends 115a, 115b that are located on opposite sides of the bubble generator 11 and are optically aligned to provide an optical path P between such I/O ends when the membrane 13 is not expanded, such that a light beam B emitting from the I/O end 115a of the first optical waveguide 15a enters the I/O end 115b of the second optical waveguide 15b when the membrane 13 is not expanded, so that a light beam B emitting from the I/O end 115a of the first optical waveguide 15a, for example, illuminates the I/O end 115b of the second optical waveguide 15b when the membrane 13 is not expanded. The opposing I/O ends 115a, 115b and an I/O end 115c of the third optical waveguide 15 are further positioned such that expansion of the membrane 13 interrupts the optical path P between the I/O ends 115a, 115b, and creates an optical path P' between the I/O end 115a of the first optical waveguide 15a and the I/O end 115c of the third optical waveguide 15c. The optical path P' more particularly includes a segment between the I/O end 115a and the reflective optical element 213, and another segment between the reflective optical element 213 and the I/O end 115c of the third optical waveguide 15b. Thus, when the membrane 13 is expanded a light beam B exiting the I/O end 115a, for example, is reflected toward the I/O end 115c, as depicted in FIG. 5B. While the included angle between the incident beam and the reflected beam is shown as being approximately a right angle, it should be appreciated that any appropriate angle could be employed depending upon implementation. The reflective optical element 213 can implemented for example as a wedge having a reflective facet 213a or a plurality of wedges having reflective facets 213a, as shown in FIG. 5C. The wedge or wedges can be formed in the top surface of the flexible membrane 13, for example by laser ablation. Switching is accomplished by selectively generating a bubble to expand the flexible membrane 13. By way of illustrative example, one or more of the optical waveguides can be a fiber optic waveguide.

Figure 6A:
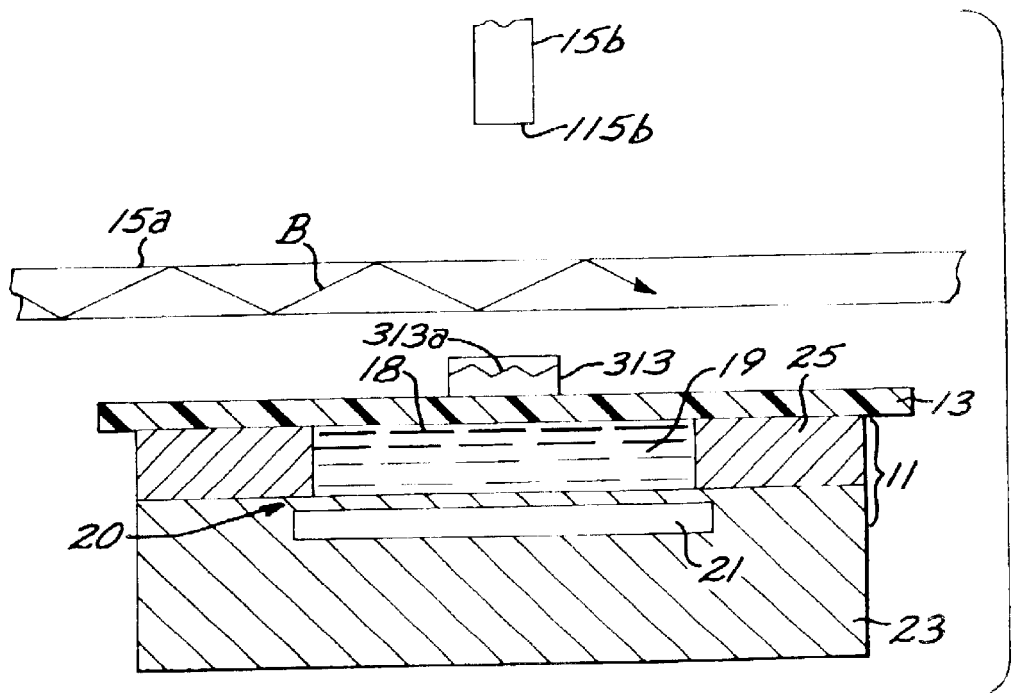
FIGS. 6A and 6B schematically depict an embodiment of a further switching apparatus that includes a bubble generator.
Figure 6B:
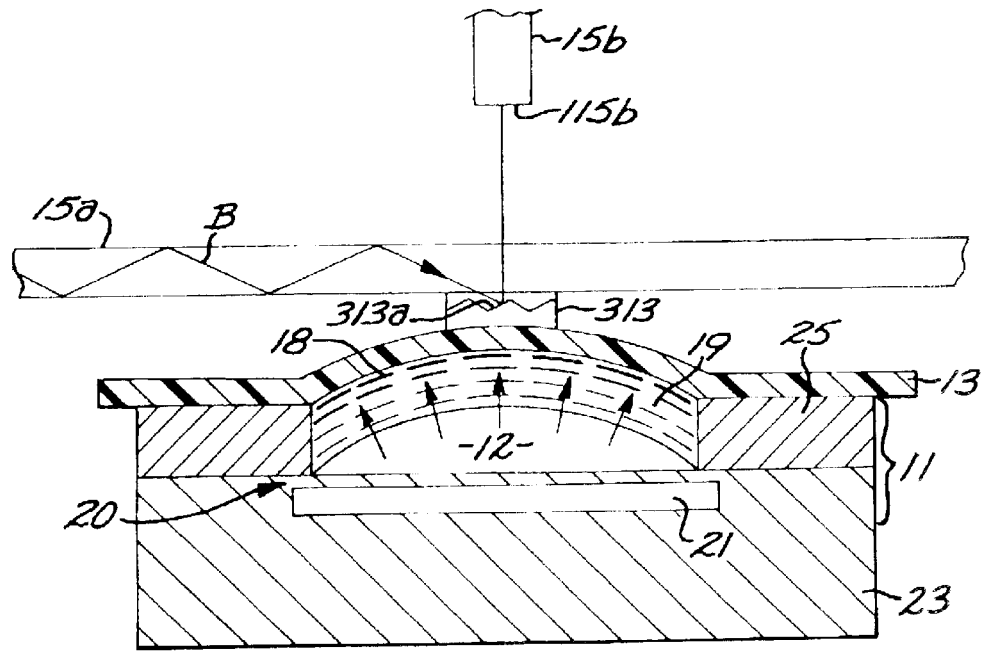

FIGS. 6A and 6B schematically depict an embodiment of a switching apparatus that includes a bubble driven actuator 20 formed of a bubble generator 11 and a flexible membrane 13 disposed over the bubble generator 11, a light switch element 313 disposed on the flexible membrane 13, and an optical switch comprised of a first optical waveguide 15a and a second optical waveguide 15b. The first optical waveguide guides a light beam B and is adjacent the light switch element 313 and sufficiently close to the light switch element such that the light switch element contacts the first optical waveguide when the flexible membrane 13 is expanded. The light switch element 313 includes one or more reflective facets 313a that are configured to reflect the light beam B that enters the light switch 313 when the light switch 313 is in contact with the first optical waveguide 15a. It should be appreciated by those skilled in the art that the light extraction performed by the light switch 313 is based on the principle of frustrated internal reflection wherein the close proximity of the light switch 313 to the first optical waveguide 15a frustrates the total internal reflection within the first optical waveguide 15a of the light beam B. An I/O end 115b of the second optical waveguide 15c is positioned to receive the reflected beam B'. Switching is accomplished by selectively generating a bubble to expand the flexible membrane 13. By way of illustrative example, one or more of the optical waveguides can be a fiber optic waveguide.

Although the foregoing has been a description and illustration of specific embodiments of the invention, various modifications and changes thereto can be made by persons skilled in the art without departing from the scope and spirit of the invention as defined by the following claims.

What is claimed is:

1. A switching apparatus comprising:

a bubble generator;

a flexible membrane disposed over the bubble generator;

the flexible membrane being selectively expanded by the bubble generator; and a switch circuit controlled by expansion of the flexible membrane, wherein the switch circuit comprises a first optical waveguide and a second optical waveguide that are selectively brought into side-by-side contact along a section of the length of the first and second optical waveguide caused by the expansion of the flexible membrane.

2. The switching apparatus of claim 1 wherein the bubble generator comprises a thermal bubble generator.

3. The switching apparatus of claim 1 wherein the bubble generator comprises a fluid chamber and a heater resistor.

4. The switching apparatus of claim 1 wherein the switch circuit comprises an electrical switch circuit.

5. A method of switching comprising:

generating a bubble to expand a membrane; and engaging a switch circuit with the expanded membrane, wherein the switch circuit comprises a first optical waveguide and a second optical waveguide that are selectively brought into side-by-side contact along a section of the length of the first and second optical waveguide caused by the expanded membrane.

6. The method of claim 5 wherein generating a bubble comprises thermally generating a bubble.

7. The method of claim 5 wherein generating a bubble comprises controlling a thermal bubble generator.

* * * * *